United States Patent
Minkin et al.

(10) Patent No.: US 10,922,146 B1
(45) Date of Patent: Feb. 16, 2021

(54) SYNCHRONIZATION OF CONCURRENT COMPUTATION ENGINES

(71) Applicant: Amazon Technologies, Inc., Seattle, WA (US)

(72) Inventors: Ilya Minkin, Los Altos, CA (US); Ron Diamant, Albany, CA (US); Drazen Borkovic, Los Altos, CA (US); Jindrich Zejda, Saratoga, CA (US); Dana Michelle Vantrease, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 16/219,530

(22) Filed: Dec. 13, 2018

(51) Int. Cl.
*G06F 9/46* (2006.01)
*G06F 9/52* (2006.01)
*G06F 8/41* (2018.01)
*G06F 9/30* (2018.01)
*G06N 3/063* (2006.01)

(52) U.S. Cl.
CPC .................. *G06F 9/52* (2013.01); *G06F 8/41* (2013.01); *G06F 9/30101* (2013.01); *G06N 3/063* (2013.01)

(58) Field of Classification Search
CPC ........................................................ G06F 9/52
USPC ........................................................ 718/102
See application file for complete search history.

(56) References Cited

U.S. PATENT DOCUMENTS

| | | | | |
|---|---|---|---|---|
| 8,238,350 | B2 * | 8/2012 | Godman | H04L 67/40 370/396 |
| 8,990,819 | B2 * | 3/2015 | Ohmacht | G06F 9/4881 718/100 |
| 10,452,449 | B1 * | 10/2019 | Verplaetse | G06F 9/5066 |
| 10,565,017 | B2 * | 2/2020 | Suh | G06N 5/04 |
| 2005/0055594 | A1 * | 3/2005 | Doering | G06F 1/12 713/375 |
| 2016/0055004 | A1 * | 2/2016 | Grochowski | G06F 9/3017 712/23 |

OTHER PUBLICATIONS

U.S. Appl. No. 16/219,610, "Synchronization of Concurrent Computation Engines", filed Dec. 13, 2018.

* cited by examiner

*Primary Examiner* — Evral E Bodden
(74) *Attorney, Agent, or Firm* — Kilpatrick Townsend & Stockton LLP

(57) ABSTRACT

Systems and methods are provided for synchronizing execution of program code for an integrated circuit device having multiple concurrently operating execution engines, where the operation of one execution engine may be dependent on the operation of another execution engine. Data or resource dependencies may be accommodated with a Set instruction to cause a first execution engine to set a register value and a Wait instruction to cause a second execution engine to wait for a condition associate with the register value. Concurrently operation of the execution engines may thus be synchronized.

21 Claims, 10 Drawing Sheets

SYNCHRONIZATION OF CONCURRENT COMPUTATION ENGINES

BACKGROUND

Integrated circuit devices, such as processors, accelerators, and others, can include multiple execution engines. For example, the integrated circuit device can include parallel execution engines that are capable of performing large, multi-stage computations, such as convolutions. As another example, the integrated circuit device can include execution engines for more specific operations, such as accumulating values or floating point math.

The data on which the execution engines operate can be retrieved from a memory of the integrated circuit device. Results produced by the execution engines can further be written to the memory. The memory may be limited in size, due to considerations such as the available space on the chip for the memory.

BRIEF DESCRIPTION OF THE DRAWINGS

Various examples in accordance with the present disclosure will be described with reference to the drawings, in which.

DETAILED DESCRIPTION

Figure 1:
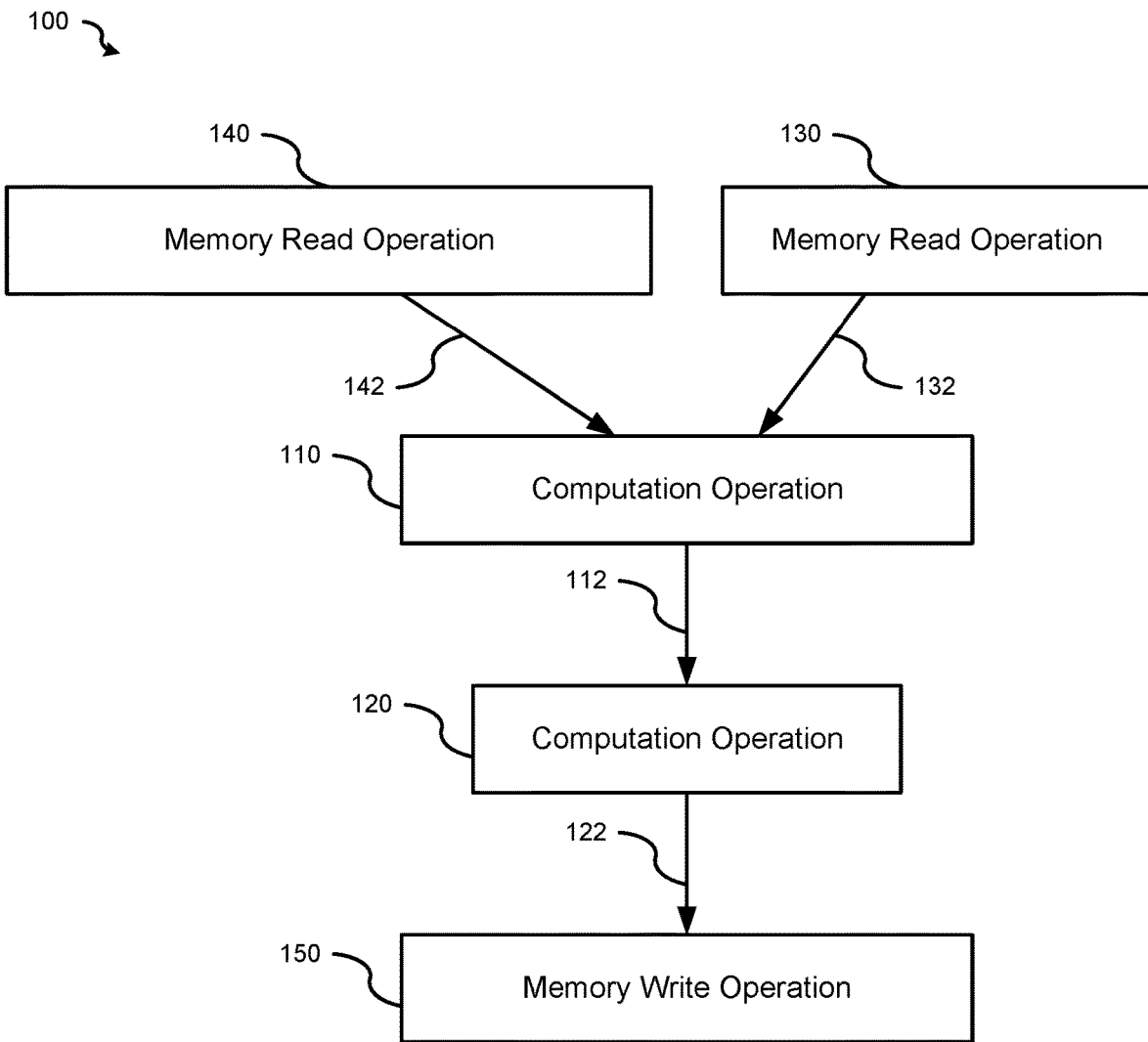
FIG. 1 is a diagram illustrating an example dataflow graph with data and/or resource dependencies.

The operations of an integrated circuit device such as a processor can be directed by instructions, which can be generated for the integrated circuit device by a compiler. A compiler is a software program that transforms programs written in human-readable programming language into machine language that can be understood by the integrated circuit device. The output of a compiler can be referred to as object code, program code, or program instructions, among other examples.

When an integrated circuit device includes multiple execution engines, in various examples, the compiler for the device can produce sets of instructions for each execution engine. The instructions for an execution engine can include steps such as reading data from memory of the device, performing a computation on the data, and writing a result of the computation back to the memory of the device. In some examples, the execution engines can independently execute respective sets of instructions, so that the execution engines can operate in parallel.

In some examples, however, the operation of one execution engine may be dependent on the operation of another execution engine. For example, a result computed by one execution engine may be needed as the input of an operation to be performed by a second execution engine. Limitations of the integrated circuit device can also cause dependencies between the execution engines. For example, the device may have a limited amount of memory or a limited number of registers in which inputs for and results from the execution engines can be stored. In this example, one execution engine may need to store a result in a memory location in which the inputs for another execution engine are stored.

When the operations of the execution engines of an integrated circuit device can have dependencies such as those described above, the compiler for the device can capture the dependencies, for example, in a dependency or dataflow graph. In a dataflow graph, nodes in the graph can represent operations or sets of operations to be performed by individual execution engines. The edges or connections between the nodes can represent dependencies between the operations at the nodes.

In various implementations, systems and methods are provided for generating instructions for an integrated circuit device. The integrated circuit device includes multiple execution engines, which may be able to operate independently but whose operations may have data and/or resource dependencies. In various examples, the techniques discussed herein can include receiving an input data set that describes the operations to be performed by the integrated circuit device. The input data can, for example, be a dataflow graph. From the input data set, a memory operation to be performed by a first execution engine can be identified, as well as an operation that is to be performed by a second execution engine and that requires that the memory operation be completed. To accommodate this dependency, the instructions for the first execution engine can include a checkpoint set instruction and the instructions for the second execution engine can include a checkpoint wait instruction. The checkpoint wait can cause the second execution engine to wait for the first execution engine to reach the checkpoint set instruction. In this way, the two execution engines can be synchronized around the data or resource dependency.

In various examples, the integrated circuit device can implement checkpoints using hardware registers. In these examples, a checkpoint may be set by writing a value to the register, incrementing a value in the register, or decrementing a value in the register. Hardware registers can have a small footprint on the chip die, and little circuitry is needed to write a register value or check a register value. Thus, using the techniques discussed herein, synchronization of the execution engines in the integrated circuit device can be accomplished with minimal additional circuitry on the integrated circuit device.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well- FIG. 1 is a diagram illustrating an example dataflow graph 100. The dataflow graph 100 can be generated, for example by a compiler, and can represent sequences of operations to be performed by an integrated circuit device. The integrated circuit device can include multiple execution engines, which are also referred to herein as computation engines. Examples of types of execution engines the device can have include a computational array (also referred to herein as a an array of processing engines, a computation engine executing an activation function, a computation engine executing a pooling operation, and a direct memory access (DMA) engine, among other examples.

In various examples, each node in the data flow graph can represent an operation to be performed by a particular execution engine of the integrated circuit device. The operations can include, for example, computations and memory operations. For example, node 110 can include a computation operation to be performed by a computational array and node 120 can include a computation to be performed by a pooling engine. In some examples, the operations at node 110 and/or node 120 can require an execution engine to execute one or more instructions to complete the operation. Examples of operations that can be described at the nodes of the dataflow graph 100 include operations for specific execution engines, such as "matrix multiply," "pool," and "activate," among other examples, and operations that can be performed by any execution engine, such as "nop." Examples of memory operations include memory read operations, such as at node 140 and node 130, and memory write operations, such as at node 150. In various examples, the memory operations can be performed by different execution engines of the integrated circuit device.

In the example of FIG. 1, connections between nodes, which can also be referred to as edges, can represent data and/or resource dependencies between the nodes. A data dependency can occur, for example, when an execution engine uses the output of another execution engine as in input for a computation. A resource dependency can occur, for example, when one execution engine needs to use a memory location that second execution engine is also using. For example, the second execution may need to write a value to the memory location, and the first execution engine may need to read the value and use the value in a computation. As another example, the second execution engine may be reading or writing a value to a memory location, and the first execution engine may (due, for example, to limited memory being available) need to write a value to the same memory location.

In various examples, each node in the graph 100 includes at least one input edge, representing inputs to the operation being performed at the node, or at least one output edge, representing an output of the operation performed at the node. For example, edge 142 from node 140 and edge 132 from node 130 each indicate that the results from the operations of node 140 and node 130 are inputs to node 110. As a further example, edge 112 from node 110 to node 120 indicates that the result of the operation of node 110 is the input to the operation of node 120. As a further example, the edge 122 from node 120 to node 150 indicates that the result of the operation at node 120 is the input to the operation at node 150.

Figure 2:
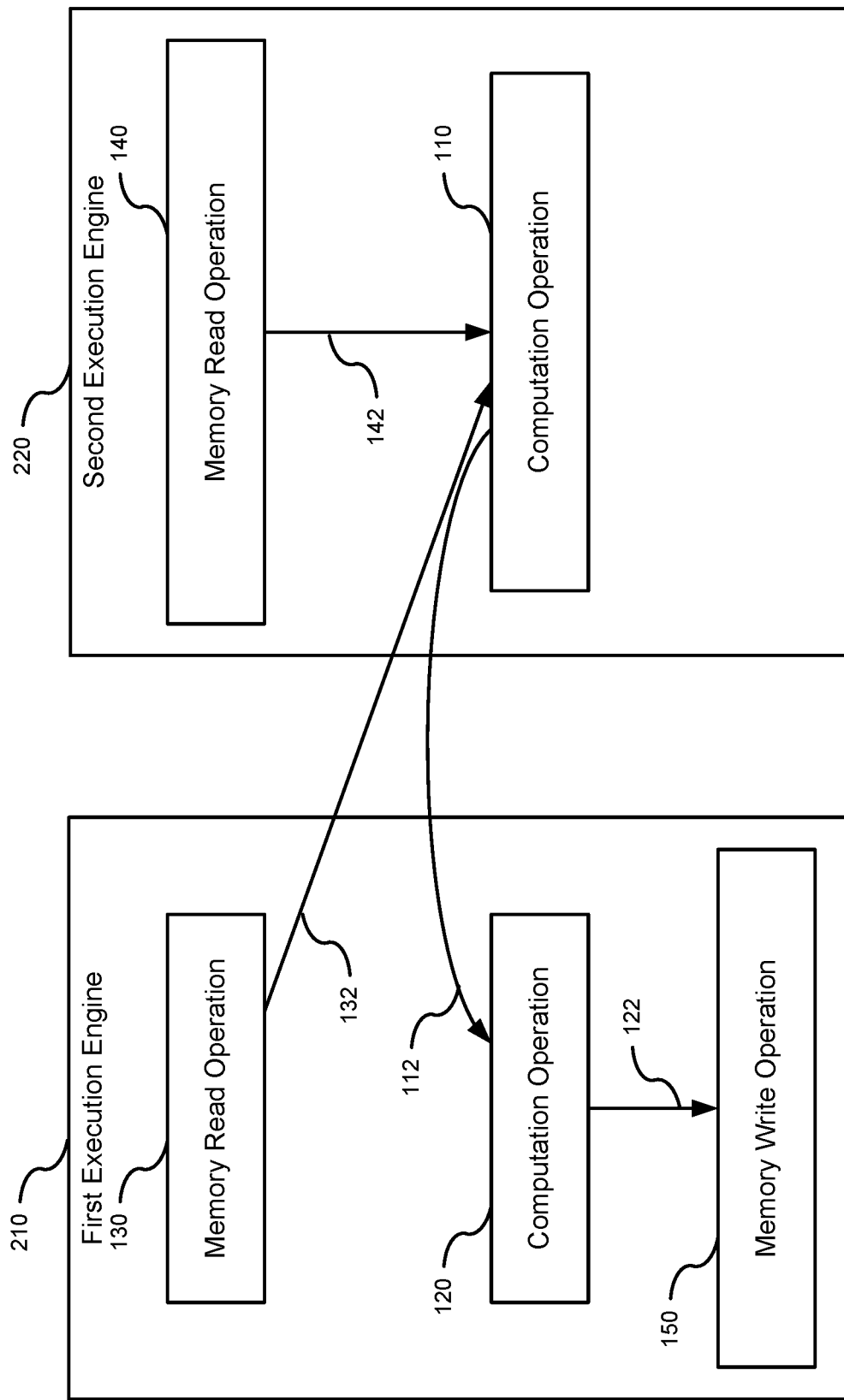
FIG. 2 is a diagram illustrating the operations in the dataflow graph of FIG. 1 as these operations may be executed by a first execution engine and a second execution engine.

FIG. 2 is a diagram illustrating the operations in the dataflow graph 100 of FIG. 1 as these operations may be executed by a first execution engine 210 and a second execution engine 220. The first execution engine 210 can be, for example, a computational array of an integrated circuit device, and the second execution engine can be a pooling engine, among other examples.

In the example of FIG. 2, the operations of node 130, which includes a memory read operation, are performed by the first execution engine 210 and the operations of node 140, which also include a memory read operation, are performed by the second execution engine 220. The second execution engine then performs the operations of node 110, which include a computation operation on the outputs of node 130 and node 140. As illustrated by this example, the computation of node 110 uses the output of the memory read operation of node 130, and thus needs for the operation of node 130 to complete before the computation can be performed. Edge 132 thus illustrates a data or resource dependency between the first execution engine 210 and the second execution engine 220. In contrast, the computation of node 110 also needs the memory read operation of node 140 to be completed, but because the operations of node 140 and node 110 are performed by the same execution engine, the edge 142 does not represent a data or resource dependency because the second execution engine 220 need not wait on another execution engine in order to proceed to the operations of node 110.

Similarly, edge 112 illustrates a dependency between the first execution engine 210 and the second execution engine 220. For example, the computation operation of node 120 may require the result of the computation operation of node 110. Edge 122 further illustrates a non-dependency, since the operations of node 150 can follow the operations of node 120 without needing to wait for the operations of another execution engine to complete.

To accommodate the dependencies such as those illustrated by the examples of FIGS. 1 and 2, in various examples, the instructions generated for the integrated circuit device can make use of checkpoint registers of the integrated circuit device. In various examples, registers are a type of memory location in the integrated circuit device that can be written to by the execution engines of the integrated circuit device, and, in some cases, also be written to be devices outside of the integrated circuit device. Additionally, the execution engines can implement instructions that wait on a value (i.e., a checkpoint) to be written to a particular checkpoint register. When the value is written, the checkpoint is considered to have been reached and the required operations completed. Instructions that wait on a checkpoint can cause an execution engine to halt or stall further execution of instructions until the checkpoint is reached by the other execution engine. When the checkpoint is reached before the execution engine executes the checkpoint wait instruction, then the execution need not stop at the wait instruction.

In various examples, a procedure for generating instructions for the integrated circuit device can include identifying each dependency in the data flow graph (or another representation of sequences of operations for the integrated circuit), and including set checkpoint and corresponding wait checkpoint instructions for each dependency. For example, the procedure can include walking the dataflow graph, and identifying each occurrence of an edge where the edge starts at a node that includes operations for one execution engine and ends at a node that includes operations for a different execution engine. As a further example, the procedure can assign a checkpoint value to each such edge. Checkpoints can be assigned, for example, using a numerical identifier in a specified checkpoint register. When generating instructions according to the data flow graph, the procedure can include, for each assigned checkpoint value in a checkpoint register, adding a "checkpoint set" instruction to the instructions for the node at the start of the edge, and a "checkpoint wait" instruction for the node at the end of the edge. For example, the "checkpoint set" instruction can be a last instruction of a set of instructions generated for the node at the start of the edge, and the "checkpoint wait" instruction can be a first instruction of the instructed generated for the node at the end of the edge. The instruction generation procedure may handle an arbitrary number of input or output edges. The only restriction on the dataflow graph is that it does not contain directed cycles; that is, repetitions of nodes and edges in the sequences of the graph (e.g., loops in the graph).

For example, the instructions for node 110 can be preceded by a checkpoint wait instruction which can identify a checkpoint register and a value to be set in the checkpoint register. In this example, the instructions for node 140 can be followed by a "checkpoint set" instruction, that identifies the same checkpoint register and a value. In this example, when the second execution engine reaches the operations described in node 110, the second execution engine can first execute the "checkpoint wait" instruction, and check whether a particular value (e.g., a value of "1") has been set in the specified checkpoint register identified by this instruction. When the value has not been set, then the operations of node 140 have not yet completed, and the second execution engine can stall. When the value is then set (or was already set when the instruction was executed), then the second execution engine can proceed with the operations of node 110.

In some examples, various instructions for an execution engine can include the ability to wait on a condition associated with a value in a checkpoint register. For example, a "matrix multiply" instruction can include an optional parameter that enables a programmer to include waiting on a checkpoint to the instruction. In this and other examples, an explicit "checkpoint wait" instruction may not be needed, and instead, generation of the instructions can include setting the parameters in the "matrix multiply" instruction that will cause the execution engine to wait for a specified value to be set in a specified checkpoint register.

Figure 3:
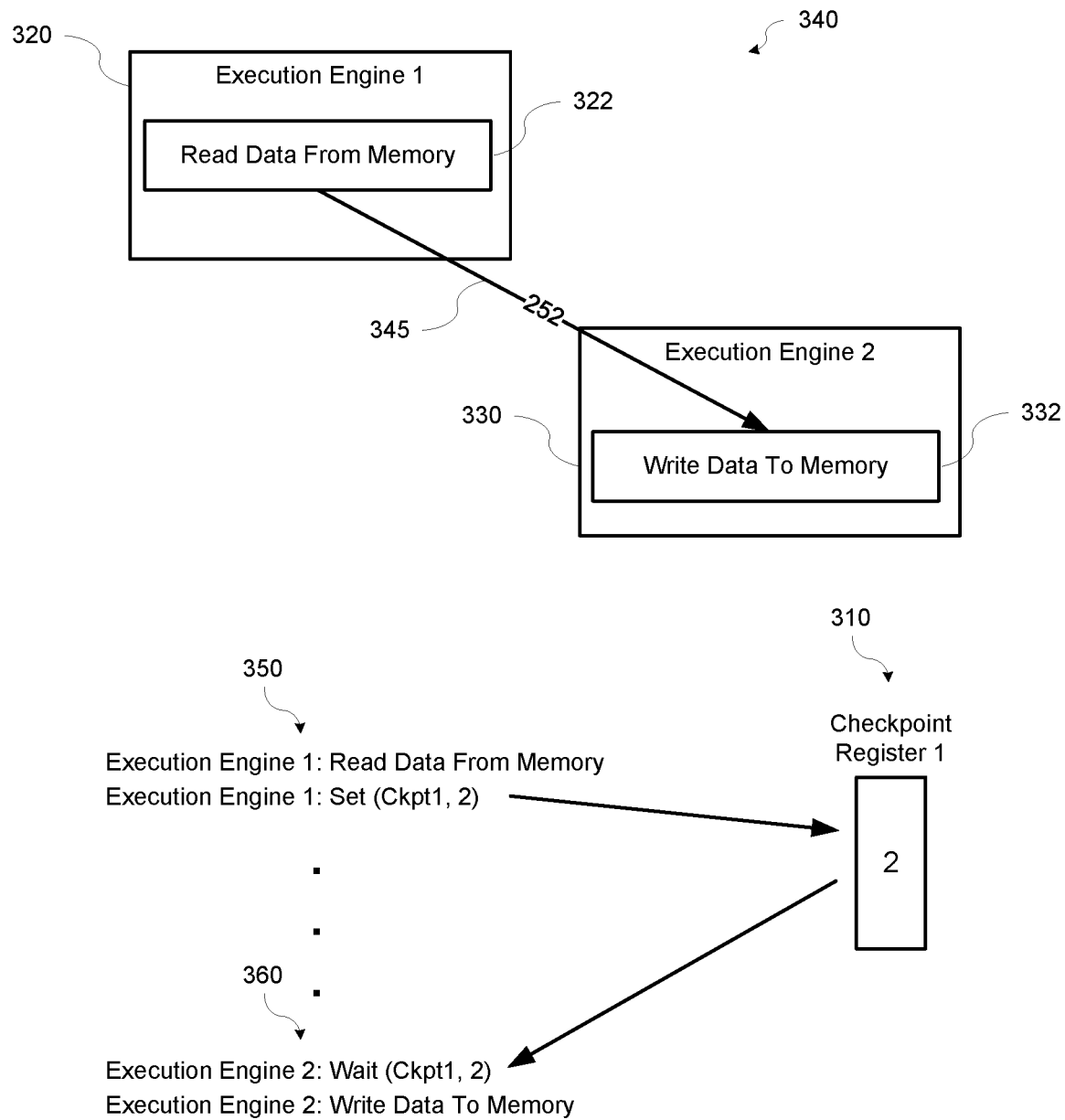
FIG. 3 is a diagram illustrating an example of setting a value in a checkpoint register.

FIG. 3 is a diagram illustrating an example of setting a value (i.e., a checkpoint) in a checkpoint register according to various aspects of the present disclosure. Referring to FIG. 3, a first execution engine 320 may require data stored in memory. The first execution engine 320 may execute a read operation 322 to read the data from memory. At the same time, a second execution engine 330 may need to perform a write operation 332 to write data to memory. Due to limited resources, the second execution engine 330 may need the memory space containing the data required by the first execution engine 320 in order to perform the write operation 332. Therefore, the read operation 322 for the first execution engine 320 must complete to free up the memory locations occupied by its data before the second execution engine 330 can perform the write operation 332 to the memory locations previously containing the data for first execution engine 320. The portion of the dataflow graph 340 illustrates this dependency as edge 345.

The instruction generation procedure may assign a checkpoint value and a checkpoint register (e.g., checkpoint register 1 and a value of "2") to the edge 345 indicating the dependency between the read operation 322 for the first execution engine 320 and the write operation 332 for the second execution engine 330. When instructions are generated from the dataflow graph, the instruction generation procedure may cause the compiler to insert a checkpoint set instruction (e.g., "Ckpt1, 2") in the code 350 generated for the first execution engine 320, after the read operation 322. The checkpoint set instruction, when executed, may cause the value "2" to be set in the checkpoint register 1 310.

The instruction generation procedure may also cause the compiler to insert a checkpoint wait instruction (e.g., "wait (Ckpt1, 2)") in the code 360 generated for the second execution engine 330, before the write operation 332. The checkpoint wait instruction, when executed, may cause the second execution engine 330 to wait for the first execution engine 320 to reach the set checkpoint instruction, which the first execution engine will execute after completing the read operation 322. Thus, synchronization between the first execution engine 320 and the second execution engine 330 may be achieved. One of ordinary skill in the art will appreciate that the use of the read/write operation is one example of a dependency that can occur, and that other types of dependencies can occur.

Certain edges of a dataflow graph may not require checkpoints for synchronization. For example, referring again to FIG. 2, the edge 122 from the second computation operation (node 120 in the first execution engine 210 to the data transfer operation at node 150 in the first execution engine 210 may not have an assigned checkpoint value because both operations are executed on the same engine (i.e., the first execution engine 210). Likewise, the edge 142 from the data transfer operation at node 140 in the second execution engine 220 to the first computation operation at node 110 in the second execution engine 220 may not have an assigned checkpoint value because both operators are executed on the same engine (i.e., the second execution engine 220).

The integrated circuit device may have a fixed or limited number of checkpoint registers. The checkpoint registers may be hardware registers that have the ability to perform atomic set, increment, decrement, and comparison operations. Execution engines may set values (i.e., a checkpoints) in the checkpoint registers and may wait on conditions associated with values in the checkpoint registers. In accordance with various aspects of the present disclosure, when a value is set in a checkpoint register, setting the value may include writing a particular value, incrementing by an arbitrary number a value previously written in the register, or decrementing by an arbitrary number a value previously written in the register. It should be understood that as used herein, unless noted otherwise, the term "set" when used to describe writing a value to a checkpoint register may include any of the writing a particular value, incrementing by an arbitrary number a value previously written in the register, or decrementing by an arbitrary number a value previously written in the register.

When an execution engine waits on a value in a checkpoint register, the value may include a particular value and/or a condition. For example, waiting on a checkpoint value in a checkpoint register may include waiting for a checkpoint value equal to a value set in the checkpoint register, waiting for a checkpoint value greater than a value set in the checkpoint register, waiting for a checkpoint value greater than or equal to a value set in the checkpoint register, waiting for a checkpoint value less than a value set in the checkpoint register, waiting for a checkpoint value less than or equal to a value set in the checkpoint register, or waiting for a checkpoint value defined by other logical conditions. It should be understood that as used herein, unless noted otherwise, the term "wait" when used to describe waiting on a value of a checkpoint register may include any of the waiting for a checkpoint value equal to a value set in the checkpoint register, waiting for a checkpoint value greater than a value set in the checkpoint register, waiting for a checkpoint value greater than or equal to a value set in the checkpoint register, waiting for a checkpoint value less than a value set in the checkpoint register, or waiting for a checkpoint value less than or equal to a value set in the checkpoint register.

In accordance with various aspects of the present disclosure, more than one address may be associated with a checkpoint register. Setting, or writing to, a different address associated with a checkpoint register may produce a different result. For example, writing a value 3 at address 10 of a particular checkpoint register may set the register to value 3. Writing a value 7 to the next address, e.g. address 20, of the checkpoint register increment the current register value by a value of 7. One of ordinary skill in the art will appreciate that the above addresses and values are merely exemplary and that other addresses and values may be used without departing from the scope of the present disclosure.

In some examples, the checkpoint registers may be global registers. The global checkpoint registers may be accessible to every execution engine. When an execution engine sets a value in a global checkpoint register, the global checkpoint register broadcasts the value (e.g., the state of the execution engine that set the value) to all of the execution engines. In a global checkpoint register implementation, any execution engine may set a value or wait on a condition associated with a value in any checkpoint register.

In some examples, the checkpoint registers may be local registers. For example, an accelerator engine may include one checkpoint register associated with each execution engine in the accelerator engine. Each execution engine may wait on a condition associated with a value (e.g., a checkpoint) in its associated local checkpoint register. In the local register implementation, remote engines (i.e., execution engines other than the execution engine associated with a particular local checkpoint register) or the host processor may remotely set values in the checkpoint register of another execution engine but may not wait on the remotely set checkpoint values. The local checkpoint registers may be included in the hardware of the associated execution engines.

In some examples, the checkpoint registers may be operable as either global checkpoint registers or local checkpoint registers or as both global and local checkpoint registers. The checkpoints created by the values set in the checkpoint registers may also serve as pseudo-program counters for the execution engines to determine the states of the execution engines thereby providing debugging capabilities.

While FIG. 3 illustrates one example of setting a checkpoint value in a checkpoint register, other examples are possible. One of ordinary skill in the art would recognize many variations, modifications, and alternatives.

Figure 4:
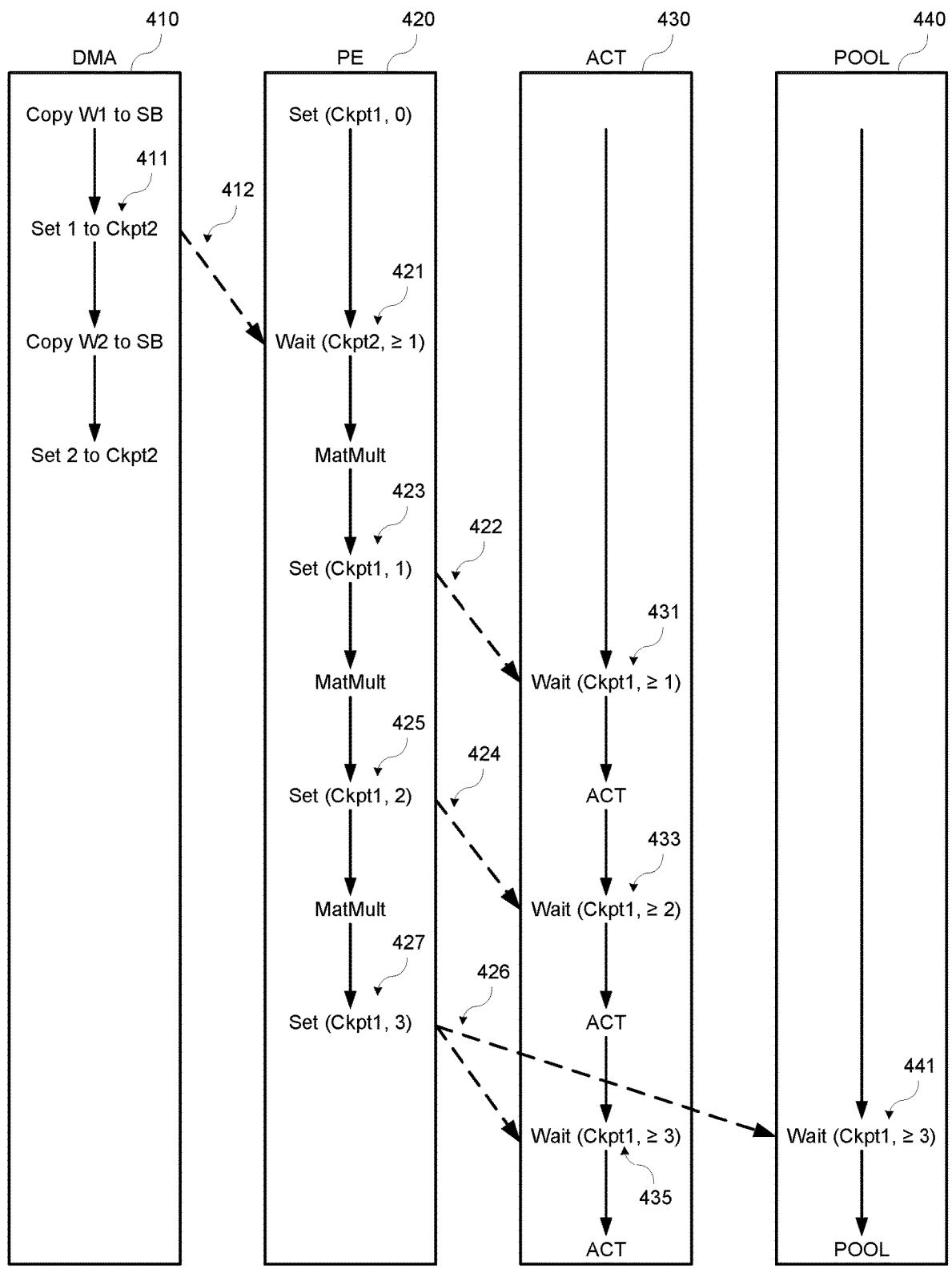
FIG. 4 is a sequence diagram illustrating an example of using checkpoints to synchronize execution engines in a global checkpoint register implementation.

In various examples, global checkpoint registers can be used to synchronize the operations of two or more execution engines of the integrated circuit device. FIG. 4 is a sequence diagram illustrating an example of using checkpoints to synchronize execution engines in a global checkpoint register implementation in accordance with various aspects of the present disclosure. As illustrated in FIG. 4, a first execution engine (e.g., a direct memory access (DMA) engine) 410, a second execution engine (e.g., a processing engine (PE)) 420, a third execution engine (e.g., an activation engine (ACT) engine) 430, and a fourth execution engine (e.g., a pooling (POOL) engine) 440, each capable of independently executing instructions. The first execution engine 410 may execute an instruction, for example, copying weights to a state buffer, and when the instruction is complete, the first execution engine 410 may execute an instruction to set a value (i.e., a checkpoint) in a global checkpoint register. For example, the first execution engine 410 may execute an instruction (i.e., Set 1 to Ckpt2) 411 to set a value of "1" in the global checkpoint register Ckpt2. The global checkpoint register Ckpt2 may broadcast 412 its value to all of the execution engines.

Independently, the second execution engine 420 executes instructions until it executes a checkpoint wait instruction to wait until a value equal to or greater than "1" set in the global checkpoint register Ckpt2 (i.e., Wait (Ckpt2, 1) 421. The second execution engine 420 may have a dependency on the operation performed by the first execution engine 410 and may halt execution of instructions until the value equal to or greater than "1" is set in the global checkpoint register Ckpt2. When the global checkpoint register Ckpt2 broadcasts 412 that the value "1" is set, the second execution engine 420 may resume executing instructions. The second execution engine 420 may continue executing instructions and may execute a checkpoint set instruction (i.e., Set (Ckpt1, 1)) 423 to set a value of "1" in a different global checkpoint register, Ckpt1. Global checkpoint register Ckpt1 may broadcast 422 its value to all of the execution engines. The second execution engine 420 may continue executing instructions.

The third execution engine 430 may independently execute instructions until it executes a checkpoint wait instruction to wait on a value equal to or greater than "1" set in the global checkpoint register Ckpt1 (i.e., Wait (Ckpt1, 1) 431. The third execution engine 430 may have a dependency on an operation performed by the second execution engine 420 and may halt execution of instructions until the value equal to or greater than "1" is set in the global checkpoint register Ckpt1. When the global checkpoint register Ckpt1 broadcasts 422 that the value "1" is set, the third execution engine 430 may resume executing instructions until it executes another checkpoint wait instruction (i.e., Wait (Ckpt1, 2) 433 indicating another dependency on an operation to be performed by the second execution engine 420. The third execution engine 430 may halt execution of instructions and wait for a value equal to or greater than "2" to be set in the global checkpoint register Ckpt1. Meanwhile, the second execution engine 420 may have executed instructions including a checkpoint set instruction to set a value of "2" in the global checkpoint register, Ckpt1 (i.e., Set (Ckpt1, 2)) 425.

When the global checkpoint register Ckpt1 broadcasts 424 that the value "2" is set, the third execution engine 430 may resume executing instructions until it executes still another checkpoint wait instruction (i.e., Wait (Ckpt1, >3) 435 indicating another dependency on an operation to be performed by the second execution engine 420 and may wait for a value equal to or greater than "3" to be set in the global checkpoint register Ckpt1. The second execution engine 420 may have executed instructions including a checkpoint set instruction to set a value of "3" in the global checkpoint register, Ckpt1 (i.e., Set (Ckpt1, 3)) 427. Independently, the fourth execution engine 440 may execute instructions until it executes a checkpoint wait instruction (i.e., Wait (Ckpt1, >3) 441 indicating a dependency on an operation to be performed by the second execution engine 420. The fourth execution engine 440 may halt execution of instructions and wait for a value equal to or greater than "3" to be set in the global checkpoint register Ckpt1. When the global checkpoint register Ckpt1 broadcasts 426 that the value "3" is set, the third execution engine 430 and the fourth execution engine 440 may resume executing instructions. Thus, in the above example, one global checkpoint register (i.e., Ckpt1) operated to coordinate several dependencies among different execution engines.

In some examples, the checkpoint wait instructions may be implemented as conditional instructions. As previously discussed, waiting on a value in a checkpoint register may include waiting for a checkpoint value equal to a value set in the checkpoint register, waiting for a checkpoint value greater than a value set in the checkpoint register, waiting for a checkpoint value greater than or equal to a value set in the checkpoint register, waiting for a checkpoint value less than a value set in the checkpoint register, or waiting for a checkpoint value less than or equal to a value set in the checkpoint register. For example, referring to the example in FIG. 4, the instructions executed by the second execution engine 420 may set monotonically increasing values in the global checkpoint register Ckpt1 (i.e., the values 1, 2, 3).

In some cases, some or all of the checkpoint set instructions executed by the second execution engine 420 may be executed before the checkpoint wait instructions for the third execution engine 430 are executed. For example, the second execution engine 420 may execute the Set (Ckpt1, 1) 423 and Set (Ckpt1, 2) 425 instructions before the third execution engine 430 executes the Wait (Ckpt1, >1) instruction 431. In such cases, the Wait (Ckpt1, >1) instruction 431 may be implemented as the conditional wait instruction "wait for a value equal to or greater than '1'." When the checkpoint wait instruction Wait (Ckpt1, >1) 431 is executed, the value in the global checkpoint register Ckpt1 will be greater than "1" and the second execution engine 420 will not halt instruction execution.

While FIG. 4 illustrates one example of using checkpoints to synchronize execution engines in a global checkpoint register implementation, other examples are possible. One of ordinary skill in the art would recognize many variations, modifications, and alternatives.

Figure 5:
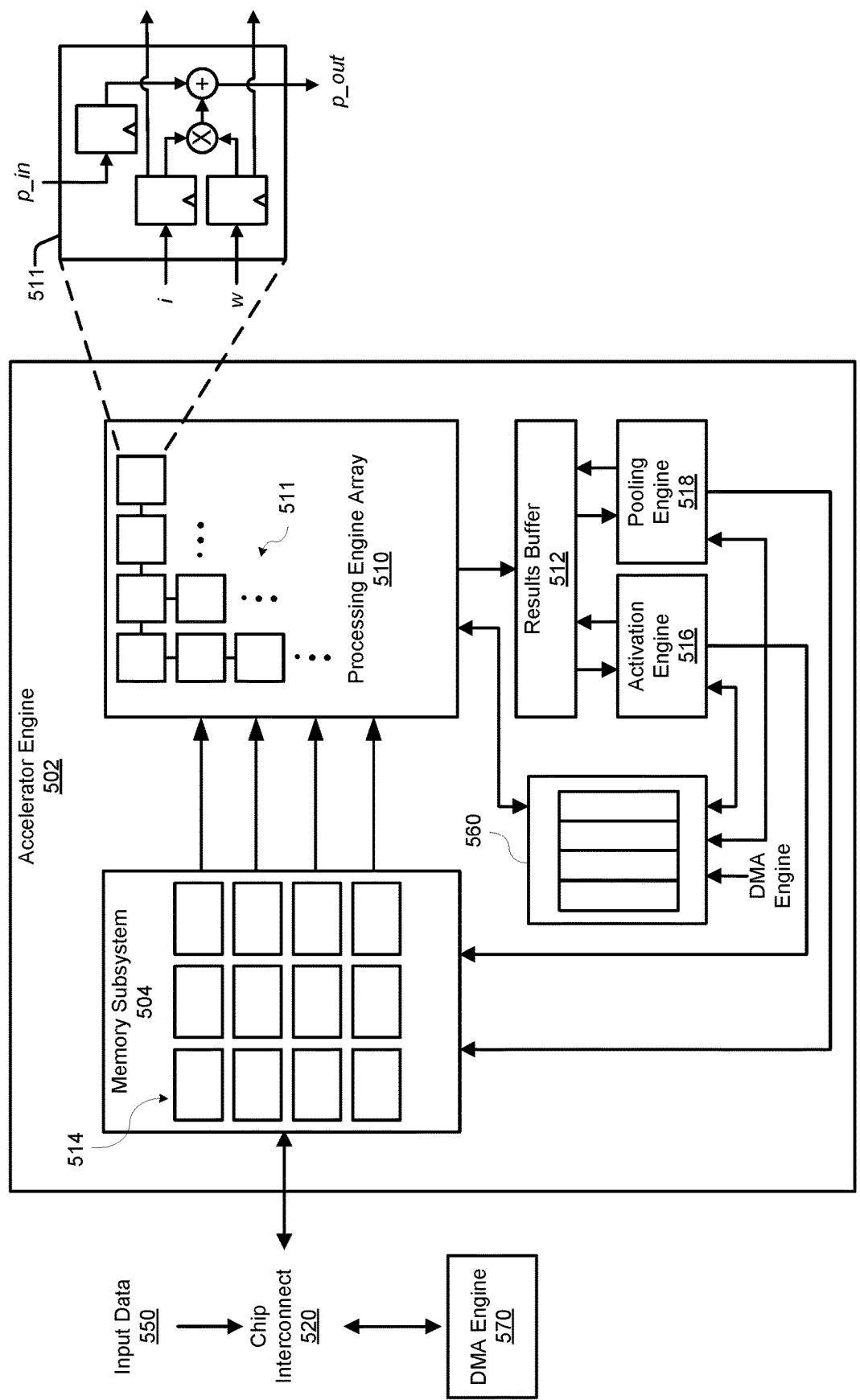
FIG. 5 is a block diagram illustrating an example of an integrated circuit device that includes global checkpoint registers and multiple execution engines that can have data inter-dependencies.

FIG. 5 is a block diagram illustrating an example of an integrated circuit device that includes global checkpoint registers and multiple execution engines that can have data inter-dependencies. The example of FIG. 5 illustrates an accelerator engine 502. In various examples, the accelerator engine 502, for a set of input data (e.g., input data 590), can execute computations using a processing engine array 520, an activation 540 block, and/or a pooling 550 block. In some examples, the example accelerator engine 502 may be an integrated circuit component of a processor, such as a neural network processor. The processor may have other integrated circuit components, including additional accelerator engines.

In various implementations, the memory subsystem 504 can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator engine 502. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516 and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hired wired to receive values from columns of the processing engine array 510, with one memory bank receiving data for each column.

The processing engine array 510 is the computation matrix of the example accelerator engine 502. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights 506, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 428 rows, or some other number of columns and rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the communication fabric 520, to be output by the system.

In some implementations, the accelerator engine 502 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and n parallel computations, where n is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator engine 502 can include a pooling engine 518. Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operating on values from corresponding columns of the processing engine array 510. In these examples, the pooling engine 518 may be able to perform between 1 and n parallel computations, where n is equal to the number of columns in the processing engine array 510. In various examples, execution channels of the pooling engine 518 can operate in parallel and/or simultaneously. In some examples, the pooling engine 518 can be bypassed.

Herein, the activation engine 516 and the pooling engine 518 may be referred to collectively as execution engines. The processing engine array 510 is another example of an execution engine. Another example of an execution engine is a Direct Memory Access (DMA) engine 570, which may be located outside the accelerator engine 502.

In some implementations, the accelerator engine 502 may include checkpoint registers 560 operable to implement checkpoint synchronization between the execution engines. The number of checkpoint registers 560 available in the accelerator engine 502 to implement checkpoint synchronization may be the same as the number of execution engines. The checkpoint registers 560 may be hardware registers that have the ability to perform atomic set, increment, decrement, and comparison operations. The checkpoint registers 560 may include synchronization logic operable to synchronize execution between the execution engines. The synchronization logic may, among other operations, broadcast a value set by one of the execution engines in one of the checkpoint registers 560 by one of the execution engines to the other execution engines.

The checkpoint registers 560 may be global checkpoint registers, meaning that any of the execution engines may set values in any of the checkpoint registers 560 and any of the execution engines may wait on conditions associated with values in any of the checkpoint registers 560. For example, any execution engine may write a particular value, increment by an arbitrary number a value previously written in the register, or decrement by an arbitrary number a value previously written in any of the global checkpoint registers. Similarly, any execution engine may wait on conditions related to a checkpoint value set in any of the global checkpoint registers, for example, but not limited to, a checkpoint value equal to a value set in the checkpoint register, a checkpoint value greater than a value set in the checkpoint register, a checkpoint value greater than or equal to a value set in the checkpoint register, a checkpoint value less than a value set in the checkpoint register, or a checkpoint value less than or equal to a value set in the checkpoint register, or other logical conditions.

Input data 550 can arrive over the communication fabric 520. The communication fabric 520 can connect the accelerator engine 502 to other components of a processor, such as a DMA engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car or virtual reality data. In some implementations, the memory subsystem 504 can include a separate buffer for the input data 550. In some implementations, the input data 550 can be stored in the memory banks 514 when the accelerator engine 502 receives the input data 550.

In some examples, the accelerator engine 502 can implement a neural network processing engine. In these examples, the accelerator engine 502, for a set of input data 550, can execute a neural network to perform a task for which the neural network was trained. Executing a neural network on a set of input data can be referred to as inference or performing inference.

The weights for the neural network can be stored in the memory subsystem 504, along with input data 550 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516 and/or pooling engine 518 may be enabled for computations called for by certain layers of the neural network. The accelerator engine 502 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location.

In various examples, local checkpoint registers can be used to synchronize the operations of two or more execution engines of the integrated circuit device. The accelerator engine 502 may include one checkpoint register associated with each execution engine in the accelerator engine 502. Each execution engine may wait on a condition associated with a value (i.e., a checkpoint) in its associated local checkpoint register. In the local register implementation, remote engines or the host processor may remotely set values in the checkpoint register of another execution engine but may not wait on the remotely set checkpoint values. The local checkpoint registers may be included in the hardware of the associated execution engines.

While FIG. 5 illustrates one example of an integrated circuit device that includes global checkpoint registers and multiple execution engines, other examples are possible. One of ordinary skill in the art would recognize many variations, modifications, and alternatives.

Figure 6:
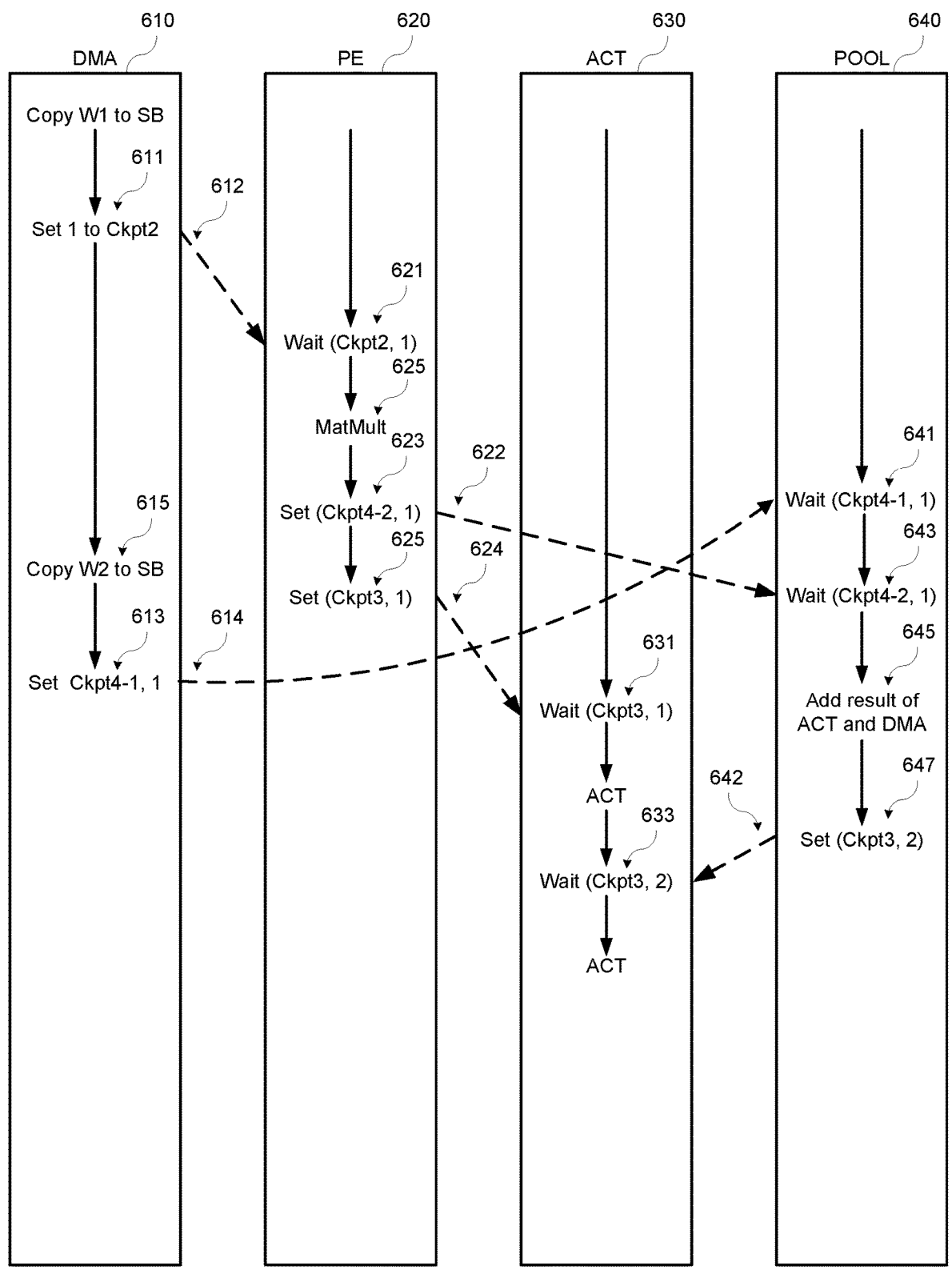
FIG. 6 is a sequence diagram illustrating an example of using checkpoints to synchronize execution engines in a local checkpoint register implementation.

FIG. 6 is a sequence diagram illustrating an example of using checkpoints to synchronize execution engines in a local checkpoint register implementation in accordance with various aspects of the present disclosure. In a local checkpoint register implementation, each execution engine may have one checkpoint register assigned to each other execution engine to handle bidirectional dependencies between the execution engines. In the present example, each execution engine may have three checkpoint registers assigned to the other execution engines. Referring to FIG. 6, for example, the fourth execution engine may have three checkpoint registers: one assigned for bidirectional dependencies with the first execution engine 610, one assigned for bidirectional dependencies with the second execution engine 620, and one assigned for bidirectional dependencies with the third execution engine 630. As illustrated in FIG. 6, a first execution engine (e.g., a direct memory access (DMA) engine) 610, a second execution engine (e.g., a processing engine (PE)) 620, a third execution engine (e.g., an activation engine (ACT) engine) 630, and a fourth execution engine (e.g., a pooling (POOL) engine) 640, each independently execute instructions. A checkpoint register may be associated with each execution engine. For example, a first local checkpoint register (e.g., Ckpt1) may be associated with the first execution engine 610, a second local checkpoint register (e.g., Ckpt2) may be associated with the second execution engine 620, a third local checkpoint register (e.g., Ckpt3) may be associated with the third execution engine 630, and a fourth local checkpoint register (e.g., Ckpt4) may be associated with the fourth execution engine 640. Each of the local checkpoint registers may include three checkpoint registers.

The first execution engine 610 may execute an instruction, for example, copying weights to a state buffer. When the instruction is complete, the first execution engine 610 may execute an instruction to set a value (i.e., a checkpoint) in a local checkpoint register associated with the second execution engine 620. For example, the first execution engine 610 may execute an instruction (i.e., Set 1 to Ckpt2) 611 to remotely set 612 a value of "1" in the local checkpoint register Ckpt2 associated with the second execution engine 620. The first execution engine 610 may continue executing instructions.

Independently, the second execution engine 620 executes instructions until it executes a checkpoint wait instruction to wait on the value "1" (i.e., Wait (Ckpt2, 1) 621 remotely set by the first execution engine 610 in the local checkpoint register Ckpt2 621 associated with the second execution engine 620. The second execution engine 620 may have a dependency on the operation performed by the first execution engine 610 and may halt execution of instructions until the value "1" set in the local checkpoint register Ckpt2. When the value "1" is set in the local checkpoint register Ckpt2, the second execution engine 620 may resume executing instructions. The second execution engine 620 may continue executing instructions and may execute an instruction (i.e., Set (Ckpt4-2, 1)) 623 to remotely set a value of "1" in the local checkpoint register Ckpt4-2 associated with the fourth execution engine 460. The second execution engine 620 may continue executing instructions.

The third execution engine 630 may independently execute instructions until it executes a checkpoint wait instruction Ckpt3 (i.e., Wait (Ckpt3, 1) 631 to wait on the value "1" set in the local checkpoint register associated with the third execution engine 630. The third execution engine 630 may have a dependency on an operation performed by the second execution engine 620 and may halt execution of instructions until the value "1" is set in the local checkpoint register Ckpt3 by the second execution engine 620. Meanwhile, the second execution engine 620 may execute a checkpoint set instruction (i.e., Set (Ckpt3, 1) 625 to remotely set the value "1" in the local checkpoint register Ckpt3 associated with the third execution engine 630.

When the value "1" is set 624 in the local checkpoint register Ckpt3, the third execution engine 630 may resume executing instructions until it executes another checkpoint wait instruction (i.e., Wait (Ckpt3, 2) 633. The third execution engine 630 may have a dependency on an operation to be performed by the fourth execution engine 640. The third execution engine 630 may halt execution of instructions and wait for the value of "2" to be remotely set in the local checkpoint register Ckpt3 associated with the third execution engine 630. Meanwhile, the first execution engine 610 may have executed instructions including an instruction to set a value (i.e., Set (Ckpt4-1, 1)) 613 in the local checkpoint register Ckpt4-1.

Independently, the fourth execution engine 640 may execute instructions until it executes checkpoint wait instructions (i.e., Wait (Ckpt4-1, 1) 641 and Wait (Ckpt4-2, 1) 643) indicating dependencies on operations to be performed by the first execution engine 610 second execution engine 620. The fourth execution engine 640 may halt execution of instructions and wait for the values of to be remotely set in the local checkpoint register Ckpt4-1 and Ckpt4-2 associated with the fourth execution engine 640. Here, the fourth execution engine 440 has a dependency on the completion of an operation by the first execution engine 610 to load weights into a state buffer (i.e., "Copy W2 to SB") 615 and a dependency on the completion of an operation by the second execution engine 620 to complete a computation instruction (i.e., "MatMult") 625. Upon completion of the Copy W2 to SB instruction 615, the first execution engine 610 may have executed an instruction (i.e., Set (Ckpt4-1, 1)) 613 to remotely set a value in the local checkpoint register Ckpt4-1. Upon completion of the MatMult instruction 625, the second execution engine 620 may have remotely set the value in the local checkpoint register Ckpt4-2 associated with the fourth execution engine 460.

When the values are set 613, 622 in the local checkpoint register Ckpt4, the fourth execution engine 440 may resume executing instructions. One of ordinary skill in the art will appreciate that the second execution engine 620 may remotely set the local checkpoint register Ckpt4-2 associated with the fourth execution engine 460 followed by the first execution engine remotely setting the local checkpoint register Ckpt4-1 with the same result.

The fourth execution engine 640 may continue executing instructions and may execute the instruction "Add result of ACT and DMA" 645 that depended on completion of the instructions by the first execution engine 610 and the second execution engine 620. The fourth execution engine 640 may execute a checkpoint set instruction (i.e., Set (Ckpt3, 2) 647 to remotely set the value "2" in the local checkpoint register Ckpt3 associated with the third execution engine 630. When the value "2" is set 642 in the local checkpoint register Ckpt3, the third execution engine 630 may resume executing instructions. Thus, in the above example, local checkpoint registers (i.e., Ckpt1, Ckpt2, Ckpt3, Ckpt4) associated with the execution engines operated to coordinate several dependencies among different execution engines.

It should be noted from the above example that an execution engine can only remotely set, increment, and decrement checkpoint values in local checkpoint registers of other execution engines but cannot wait on the remote checkpoint values.

While FIG. 6 illustrates one example of a sequence diagram illustrating the use of checkpoints to synchronize execution engines in a local checkpoint register implementation, other examples are possible. One of ordinary skill in the art would recognize many variations, modifications, and alternatives.

Further, while the example of FIG. 6 describes an embodiment including three checkpoint registers associated with each execution engine, embodiments in accordance with the present disclosure are not limited to this implementation. For example, in some implementations, each execution engine may have one associated checkpoint register that may be remotely set by the other execution engines. One of ordinary skill in the art will appreciate that other variations are possible without departing from the scope of the present disclosure.

Figure 7:
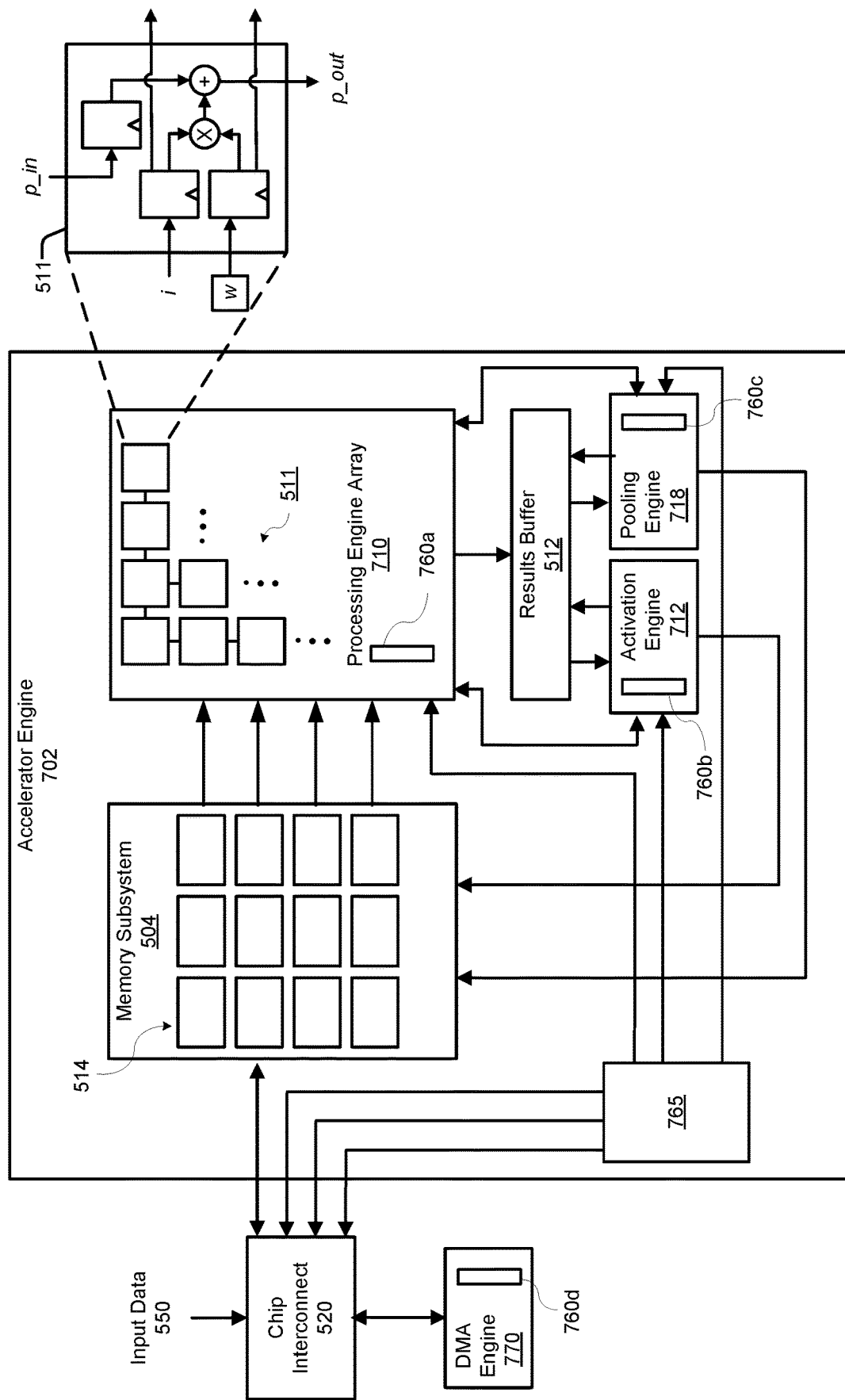
FIG. 7 is a block diagram illustrating an example of an integrated circuit device that includes local checkpoint registers and multiple execution engines that can have data inter-dependencies.

FIG. 7 is a block diagram illustrating an example of an integrated circuit device that includes local checkpoint registers and multiple execution engines that can have data inter-dependencies. The example of FIG. 7 illustrates an accelerator engine 702. In various examples, the accelerator engine 702 includes processing engine array 720, an activation 740 block, and/or a pooling 750 block as well as a DMA engine 770, which may be located outside the accelerator engine 702. The processing engine array 720, the activation 740 block, the pooling 750 block, and DMA engine 770 are examples of execution engines an operate as described with respect the corresponding execution engines in FIG. 5. Thus, their operation will not be repeated here.

In some implementations, the accelerator engine 702 may include checkpoint registers 760a-760d operable to implement checkpoint synchronization between the execution engines. The checkpoint registers may be included in the hardware of their associated execution engines. Each execution engine (including the DMA engine) in the accelerator engine 702 may have an associated checkpoint register to implement checkpoint synchronization may between the execution engines. The checkpoint registers 760a-760d may be hardware registers that have the ability to perform atomic set, increment, decrement, and comparison operations. The accelerator engine 702 may include synchronization logic 765 operable to synchronize execution between the execution engines. The synchronization logic 765 may, among other operations, coordinate remote setting of a checkpoint value by one of the execution engines in the checkpoint registers associated with the other execution engines.

The checkpoint registers 760a-760d may be local checkpoint registers, meaning that any of the execution engines may wait on conditions associated with checkpoint values remotely set in their associated checkpoint registers by another execution engine, but an execution engine that remotely sets a checkpoint value may not wait on that remotely set checkpoint value. For example, any execution engine may, for a local checkpoint register associated with another execution engine, remotely write a particular value, increment by an arbitrary number a value previously written in the register, or decrement by an arbitrary number a value previously written in of the local checkpoint register. Any execution engine may wait on conditions related to a checkpoint value set in its associated local checkpoint register, for example, but not limited to, a checkpoint value equal to a value set in the checkpoint register, a value checkpoint than a value set in the checkpoint register, a checkpoint value greater than or equal to a value set in the checkpoint register, a checkpoint value less than a value set in the checkpoint register, or a checkpoint value less than or equal to a value set in the checkpoint register, or other logical conditions. An execution engine may not wait on a value remotely set in the local checkpoint register associated with another execution engine.

While FIG. 7 illustrates one example of an integrated circuit device that includes local checkpoint registers and multiple execution engines, other examples are possible. One of ordinary skill in the art would recognize many variations, modifications, and alternatives.

Figure 8:
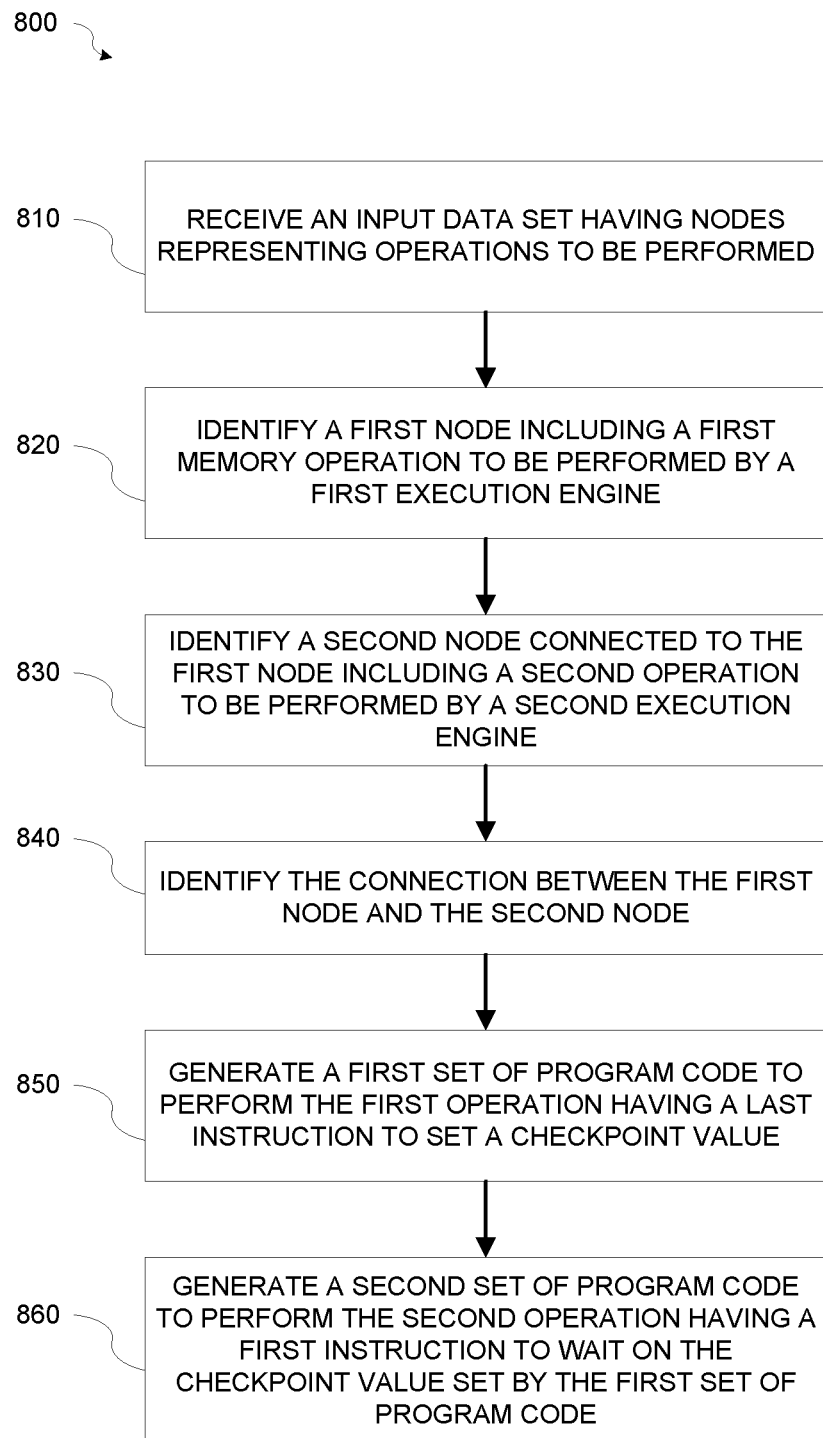
FIG. 8 is a flowchart illustrating an example computer-implemented method for generating program code.

FIG. 8 is a flowchart illustrating an example computer-implemented method 800 for generating program code for an integrated circuit device. In various examples, the method 800 can be performed by a computing device that includes a processor and a memory operable to store instructions that can be executed by the processor, the instructions including ones for performing the steps of the method 800. In various examples, the method 800 may be embodied on a non-transitory computer readable medium.

Referring to FIG. 8, a compiler may generate an input data set that describes the operations to be performed by an integrated circuit device. The integrated circuit may receive the input data set (block 810). The input data set may be organized in a graph, for example a dataflow graph, having connections between nodes. The nodes in the graph may represent operations to be performed by an execution engine, for example, a first execution engine or a second execution engine, of an integrated circuit device and the connections between the nodes may represent data and/or resource dependencies between the nodes. Because of the dependencies, operations between the execution engines may need to be synchronized.

Block 820 of the method identifies a first node in the input data set with a data or resource dependency. The first node on the graph may include a first operation to be performed by the first execution engine. The first operation may include a first memory operation involving a memory location in the integrated circuit device. The first operation may include a computation or a data transfer operation. The first node may have a graph edge indicating the dependency from another node on the graph. For example, a computation or a memory transfer operation may need to be completed by the first execution engine to enable an operation performed by the second execution engine to begin.

At block 830, a second node in the input data set that has a connection indicating a dependency from the first node may be identified. The second node may include a second operation to be performed by the second execution engine. The second operation may use the memory location used by the first memory operation. Thus, the second operation may require the first memory operation performed by the first execution engine to be completed before the second operation begins.

At block 840 of the method, a checkpoint register and a checkpoint value may be assigned to the connection between the first node and the second node of the graph (e.g., the input data set). An instruction generation procedure may assign the checkpoint register and checkpoint value to the connection (i.e., the graph edge connecting the first and second nodes). The integrated circuit device can implement checkpoints using hardware registers. The assigned checkpoint value is set in the checkpoint register when instructions executed by the execution engine reach the connection (i.e., dependency) between the nodes. Hardware registers can have a small footprint on the chip die, and little circuitry is needed to write a register value or check a register value.

The instruction generation procedure may assign different checkpoint values for the same checkpoint register or may assign values for different checkpoint registers to dependency edges of the dataflow graph in order to implement the dependencies represented by the edges. A checkpoint register may be a fixed length, for example, 256 bits or another length. The assigned checkpoint values for each checkpoint register may be monotonically increasing values.

In order to maintain the order of operations having data and/or resource dependencies, at block 850 a first set of program code including a checkpoint set instruction may be generated for the first execution engine. The instructions in the first set of program code for performing the first operation may include the checkpoint set instruction as a last instruction in the first set of program code. The checkpoint set instruction may be an instruction to set a value (i.e., a checkpoint) associated with assigned to a dependency. The integrated circuit device can implement the checkpoint using a hardware register, e.g., a checkpoint register.

When the checkpoint set instruction is executed, the assigned checkpoint value may be set in the checkpoint register. The instruction generation procedure may assign a checkpoint to the dependency edge of the dataflow graph indicating the dependency between the first memory operation on the first execution engine and the second memory operation on the second execution engine. The checkpoint may correspond to a value set in a checkpoint register of the integrated circuit. The checkpoint value corresponding to the dependency may be set in the checkpoint register when the first set of program code is executed and the checkpoint set instruction is reached. When the checkpoint value corresponding to the dependency is set in the checkpoint register, the checkpoint register may broadcast the value to the second execution engine.

At block 860, a second set of program code including a checkpoint wait instruction and instructions for performing the second operation may be generated for the second execution engine. The second set of program code may include the checkpoint wait instruction as a first instruction in the second set of program code. The checkpoint wait instruction may cause the second execution engine to wait on a condition associated with the checkpoint value in the checkpoint register. For example, the instruction generation procedure may assign a checkpoint value to a dependency edge of the dataflow graph indicating a dependency between the first memory operation on the first execution engine and the second memory operation on the second execution engine. The checkpoint value may be set in the checkpoint register when the first set of program code is executed by the first execution engine and the checkpoint set instruction is reached. Because the checkpoint wait instruction is generated as the first instruction in the second set of program code, when the second set of program code is executed the checkpoint wait instruction may cause the second execution engine to wait for the operations performed by the first execution engine to complete before starting execution of the second operation by the second execution engine.

In some cases, execution engines may execute non-blocking instructions, also referred to as asynchronous instructions. An asynchronous instruction is a non-blocking instruction that may not finish completely before a next instruction begins executing. Code execution issues may arise when a non-blocking instruction executing on one execution engine needs to inform two or more other execution engines having dependencies that the non-blocking instruction has completely finished.

Non-blocking instructions may include an embedded checkpoint set instruction in addition to explicit checkpoint set/checkpoint wait instructions. The embedded checkpoint set instruction executes when a non-blocking instruction completely finishes, which can be many cycles after the non-blocking instruction starts. The explicit checkpoint set instruction, on the other hand, executes as soon as the non-blocking instruction starts.

In some examples, the embedded checkpoint set instruction may be followed by an explicit checkpoint wait instruction. The explicit checkpoint wait instruction may cause the execution engine to wait on its own embedded checkpoint set instruction. The explicit checkpoint wait instruction for the non-blocking instruction may be followed by explicit checkpoint wait-instructions for other execution engines having dependencies on the non-blocking instruction.

Example pseudo-code is shown below:
1 Async op (c, a, b) [set (Ckpt1, 1)]
2 Wait (Ckpt1, 1)
3 Set (Ckpt2, 1)
4 Set (Ckpt3, 2)
5 Ops At line 1, a first execution engine may execute an example non-blocking operation on variables a and b to produce result c. A second execution engine and a third execution engine may depend on the result c. The non-blocking instruction includes the embedded set-event instruction to set checkpoint register 1 to a value of "1." At line 2 an explicit checkpoint wait instruction may cause the first execution engine to wait on the embedded checkpoint set instruction that was set as part of the non-blocking instruction in line 1. After the non-blocking instruction has completed to the checkpoint value "1" in checkpoint register 1 and the checkpoint wait instruction in line 2 has executed, at line 3 the first execution engine may execute an explicit checkpoint set instruction (i.e., set (Ckpt2, 1)) to set a checkpoint value for a checkpoint register associated with a second execution engine and may execute another explicit checkpoint set (i.e., (Ckpt3, 2)) to set a checkpoint value for a checkpoint register associated with a third execution engine indicating that the non-blocking instruction has completed. At line 5, code execution may continue for the first execution engine.

Figure 9:
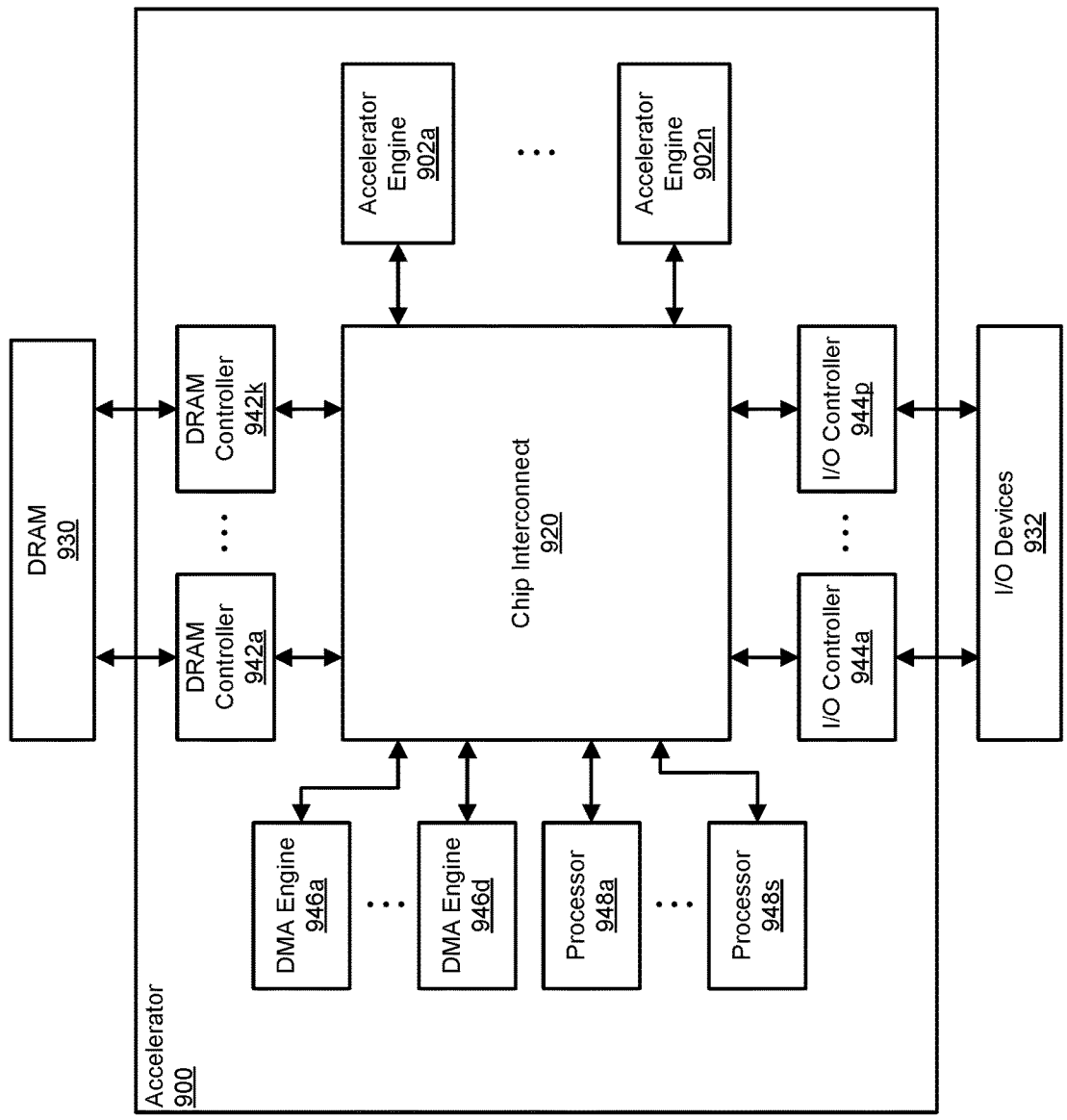
FIG. 9 includes a block diagram that illustrates an example of an acceleration engine.

FIG. 9 includes a block diagram that illustrates an example of an accelerator 900. The accelerator 900 is an example of an integrated circuit that can include one or more accelerator engines 902a-902n that may be similar to the accelerator engines illustrated in FIGS. 5 and/or 7.

In the example of FIG. 9, the accelerator 900 includes multiple accelerator engines 902a-902n, each of which can perform a set of operations. In various examples, the accelerator engines 902a-902n for particular types of operations, so that the accelerator engines 902a-902n can perform the operations much faster than when similar operations are performed by a general purpose processor. In various examples, to perform a set of operations, input data on which the operations are to be performed must first be moved into the accelerator engines 902a-902n. Additionally, in some cases, program code is also moved into the accelerator engines 902a-902n, which programs the operations that the accelerator engines 902a-902n will perform on the data. In the illustrated example, the accelerator 900 includes n accelerator engines 902a-902n. Examples of accelerators that can be included in the accelerator 900 include graphics accelerators, floating point accelerators, neural network accelerators, and others. In various examples, the accelerator engines 902a-902n can each be the same (e.g., each of the is a graphics accelerator) or can be different (e.g., the accelerator engines 902a-902n include a graphics accelerator, a floating point accelerator, and neural network accelerator).

The example accelerator 900 further includes DRAM controllers 942a-942k for communicating with an external memory. The external memory is implemented, in this example, using DRAM 930. In the illustrated example, the accelerator 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerator engines 902a-902n to perform different operations. For example, when one of the accelerators is a neural network accelerator, one program can configure the neural network accelerator to perform speech recognition while another program can configure the neural network accelerator to perform image recognition. In various examples, different accelerator engines 902a-902n can be programmed with different programs, so that each performs a different set of operations. In various examples, the processors 948a-948s can manage moving of program code from the DRAM 930 to the accelerator engines 902a-902n.

The example accelerator 900 further includes I/O controllers 944a-944p for communicating with I/O devices 932 in the system. The accelerator 900 can communicate with I/O devices over, for example, a processor bus. In some examples, the processor bus can be implemented using Peripheral Component Interconnect (PCI) and/or a variation of the PCI bus protocol. The processor bus can connect the accelerator 900 to I/O devices such as, for example, input and output devices, memory controllers, storage devices, and/or network interface cards, among other things. In some examples, the I/O controllers 944a-944p can enable the accelerator 900 to act as an I/O device for a host processor. For example, the accelerator 900 can be the recipient of input data from the host processor, and a command indicating an operation to be performed on the input data (e.g., a particular computation or analysis). In the illustrated example, the accelerator 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the accelerator 900 can be managed by one or more processors 948a-948s, which can also be referred to as data management processors. In the example of FIG. 9, the accelerator 900 includes s processors 948a-948s incorporated into (e.g., on the same silicon die) the device. In other examples, the processors 948a-948s can be external to the accelerator 900 (e.g., on a different die and/or in a different package). In some examples, the processors 948a-948s can manage the movement of data from I/O devices 932 to the accelerator engines 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerator engines 902a-902n may be located on an I/O device 932 or in processor memory.

The example accelerator 900 further includes DMA engines 946a-946d that can move data between the accelerator engines 902a-902n, DRAM controllers 942a-942k, and I/O controllers 944a-944p. In the illustrated example, the accelerator 900 includes d DMA engines 946a-946d. In some implementations, the DMA engines 946a-946d can be assigned to specific tasks, such as moving data from the DRAM controllers 942a-942d to the accelerator engines 902a-902n, or moving data between the I/O controllers 944a-944p and the accelerator engines 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerator engines 902a-902n, and DMA engines 946a-946d is determined by program code being executed by each respective processor.

In the example accelerator 900, the various components can communicate over a chip interconnect 920. The chip interconnect 920 primarily includes wiring for routing data between the components of the accelerator 900. In some cases, the chip interconnect 920 can include a minimal amount of logic, such as multiplexors to control the direction of data, flip-flops for handling clock domain crossings, and timing logic.

Figure 10:
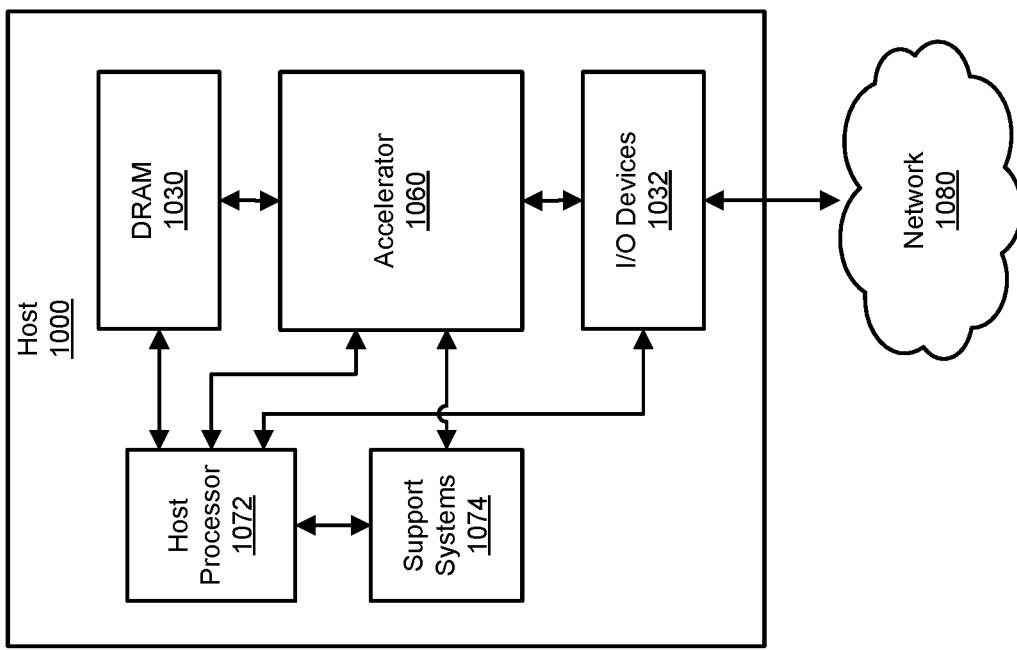
FIG. 10 includes a block diagram that illustrates an example of a host system.

FIG. 10 includes a block diagram that illustrates an example of a host system 1000 in which an accelerator 1060 can be used. The accelerator 1060 of FIG. 10 is an example of a device that can include one or more accelerator engines such as is illustrated in FIGS. 5 and/or 7. The example host system 1000 of FIG. 10 includes the accelerator 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor In some examples, the host system 1000 can include more than one host processor 1072. In some examples, the host processor 1072 and the accelerator 1060 can be one chip, such as, one or more integrated circuits within the same package.

In various examples, the host processor 1072 can communicate with other components in the host system 1000 over one or more communication channels. For the example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the neural network process 1080 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the accelerator 1060. In some examples, the programs can select an appropriate neural network to execute for a given input. For example, a program may be for language translation, and can select one or more neural networks capable of speech recognition and/or machine translation. In these and other examples, the programs can configure the accelerator 1060 with the neural network to execute, and/or can select a neural network processing engine on the accelerator 1060 that has previously been configured to execute the desired neural network. In some examples, once the accelerator 1060 has started inference on input data, the host processor 1072 can manage the movement of data (such as weights, instructions, intermediate results, results of conditional layers, and/or final results) into or out of the accelerator 1060.

In some examples, a software program that is using the accelerator 1060 to conduct inference can read the result from a conditional layer from the accelerator 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on.

The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others, as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the accelerator 1060. For example, the support systems 1074 can include a microprocessor that coordinates the activities of the accelerator 1060, including moving data around on the accelerator 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 1072. In some examples, the program executed by the microprocessor is stored on the hardware of microprocessor, or on a non-volatile memory chip in the host system 1000. In some examples, the microprocessor and the accelerator 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the accelerator 1060 to execute the neural network on the set of input data. In some examples, the support systems 1074 only needs to select an appropriate neural network processing engine of the neural network processor. In some examples, the support systems 1074 may need to load the data for the neural network onto the accelerator 1060 before the accelerator 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for generating, by a compiler, program code for an integrated circuit device having multiple concurrently operating execution engines, the method comprising:
   receiving, at a computing device, an input data set, wherein the input data set is organized in a graph, wherein nodes in the graph represent operations to be performed by a first execution engine or a second execution engine of the integrated circuit device, and wherein connections between the nodes represent data or resource dependencies between the nodes;
   identifying a first node in the input data set that includes a first operation to be performed by the first execution engine, wherein the first operation generates a result;
   identifying a second node in the input data set that has a connection from the first node, wherein the second node includes a second operation to be performed by the second execution engine, wherein the second operation uses the result generated by the first operation;
   assigning a checkpoint value to the connection, wherein the checkpoint value is associated with a checkpoint register of the integrated circuit device;
   generating a first set of program code including instructions for performing the first operation, wherein a last instruction in the first set of program code causes the first execution engine to set the checkpoint value corresponding to the connection in the checkpoint register; and
   generating a second set of program code including instructions for performing the second operation, wherein a first instruction in the second set of program code is a wait instruction, wherein the wait instruction causes the second execution engine to wait for a condition associated with the checkpoint value corresponding to the connection in the checkpoint register,
   wherein the checkpoint register comprises a plurality of checkpoint registers, and wherein each of the plurality of checkpoint registers is accessible to both the first execution engine and the second execution engine, and
   wherein, when the checkpoint value is set in the checkpoint register, the integrated circuit device is operable to broadcast the checkpoint value to the second execution engine.

2. The computer-implemented method of claim 1, wherein setting the checkpoint value in the checkpoint register comprises setting a specific value to the checkpoint register, incrementing a current value of the checkpoint register by a specified value, or decrementing the current value of the checkpoint register by a specified value.

3. The computer-implemented method of claim 1, wherein the checkpoint register comprises a register in the integrated circuit device, wherein each of the execution engines is operable to write the checkpoint value to the checkpoint register or wait for a condition associated with value set in the checkpoint register.

4. The computer-implemented method of claim 1, wherein the first execution engine or the second execution engine includes an array of processing engines, a computation engine executing a pooling operation, a computation engine executing an activation function, or a Direct Memory Access (DMA) engine.

5. The computer-implemented method of claim 1, wherein the integrated circuit device is a neural network processor.

6. A computer-implemented method, comprising:
   receiving, at a computing device, an input data set including operations to be performed by an integrated circuit device and dependencies between the operations;
   identifying a first operation in the input data set, wherein the first operation is to be performed by a first execution engine of the integrated circuit device;
   identifying a second operation in the input data set, wherein the second operation is to be performed by a second execution engine of the integrated circuit device, wherein the second operation requires that the first operation be completed;
   generating a first set of program code including an instruction for performing the first operation, wherein a last instruction in the first set of program code is an instruction to set a checkpoint value in a checkpoint register of the integrated circuit device; and
   generating a second set of program code including instructions for performing the second operation, wherein a first instruction in the second set of program code is an instruction to wait for a condition associated with the checkpoint value in the checkpoint register,
   wherein the checkpoint register comprises a plurality of checkpoint registers, and wherein each of the plurality of checkpoint registers is accessible to both the first execution engine and the second execution engine, and
   wherein, when the checkpoint value is set in the checkpoint register, the integrated circuit device is operable to broadcast the checkpoint value to the second execution engine.

7. The computer-implemented method of claim 6, wherein the first operation is writing a result to a memory of the integrated circuit device, and wherein the second operation uses the result.

8. The computer-implemented method of claim 6, wherein the first operation is reading a first value from a location in a memory of the integrated circuit device, and wherein the second operation includes writing a second value to the location in the memory.

9. The computer-implemented method of claim 6, wherein the checkpoint register is one of a fixed number of registers of the integrated circuit device.

10. The computer-implemented method of claim 6, wherein
   a first checkpoint register of the plurality of checkpoint registers is associated with the first execution engine, and
   a second checkpoint register of the plurality of checkpoint registers is associated with the second execution engine.

11. The computer-implemented method of claim 10, wherein the first execution engine is operable to remotely set the checkpoint value in the second checkpoint register.

12. The computer-implemented method of claim 6, wherein the checkpoint register has a plurality of associated addresses, and
   wherein writing a value to one of the plurality of associated addresses causes the checkpoint register to perform setting a specific value to the checkpoint register, incrementing a current value of the checkpoint register by a specified value, or decrementing the current value of the checkpoint register by a specified value.

13. The computer-implemented method of claim 6, wherein waiting for the checkpoint value to be set in the checkpoint register comprises waiting for a checkpoint value greater than a value set in the checkpoint register, waiting for a checkpoint value greater than or equal to the checkpoint value set in the checkpoint register, waiting for a checkpoint value less than the value set in the checkpoint register, or waiting for a checkpoint value less than or equal to the value set in the checkpoint register.

14. A non-transitory computer readable medium having stored therein a program for making a computer execute a method for generating program code to coordinate a plurality of execution engines of an integrated circuit device, the program including computer executable instructions for performing operations comprising:
   receiving an input data set including operations to be performed by the integrated circuit device and dependencies between the operations;
   identifying a first operation in the input data set, wherein the first operation is to be performed by a first execution engine of the integrated circuit device;
   identifying a second operation in the input data set, wherein the second operation is to be performed by a second execution engine of the integrated circuit device;
   identifying a third operation in the input data set, wherein the third operation is to be performed by a third execution engine of the integrated circuit device, wherein the third operation requires that the first operation and the second operation be completed;
   generating a first set of program code including an instruction for performing the first operation, wherein a last instruction in the first set of program code is an instruction to set a first checkpoint value in a checkpoint register;
   generating a second set of program code including instructions for performing the second operation, wherein a last instruction in the second set of program code is an instruction to set a second checkpoint value in the checkpoint register; and
   generating a third set of program code including an instruction for performing the third operation, wherein a first instruction in the third set of program code is an instruction to wait for a condition associated with the second checkpoint value in the checkpoint register,
   wherein the checkpoint register comprises a plurality of checkpoint registers, and wherein each of the plurality of checkpoint registers is accessible to the first execution engine, the second execution engine, and the third execution engine, and
   wherein, when the second checkpoint value is set in the checkpoint register, the integrated circuit device is operable to broadcast the second checkpoint value to the third execution engine.

15. The non-transitory computer readable medium having stored therein a program as defined in claim 14, wherein the checkpoint register is associated with the third execution engine.

16. The non-transitory computer readable medium having stored therein a program as defined in claim 15, wherein the last instruction in the first set of program code increments a current checkpoint value in the checkpoint register to set the first checkpoint value, and wherein the last instruction in the second set of program code increments the first checkpoint value.

17. The non-transitory computer readable medium having stored therein a program as defined in claim 14, wherein the first operation is reading a first value from a location in a memory of the integrated circuit device, wherein the second operation includes a computation operation, and wherein the third operation is a computation operation that requires the first value and a result of the computation operation.

18. The non-transitory computer readable medium having stored therein a program as defined in claim 14, wherein checkpoint values set in the checkpoint register are monotonically increasing values.

19. The non-transitory computer readable medium having stored therein a program as defined in claim 14, wherein setting a checkpoint value in the checkpoint register comprises setting a specific value to the checkpoint register, incrementing a current value of the checkpoint register by a specified value, or decrementing the current value of the checkpoint register by a specified value.

20. The non-transitory computer readable medium having stored therein a program as defined in claim 14, wherein the first execution engine, the second execution engine, or the third execution engine includes an array of processing engines, a computation engine executing a pooling operation, a computation engine executing an activation function, or a Direct Memory Access (DMA) engine.

21. The non-transitory computer readable medium having stored therein a program as defined in claim 14, wherein the integrated circuit device is a neural network processor.

* * * * *